United States Patent [19]

Kim

[11] Patent Number: 5,291,354

[45] Date of Patent: Mar. 1, 1994

[54] LID OPENING MECHANISM FOR A DIGITAL AUDIO TAPE CASSETTE

[75] Inventor: Yoon B. Kim, Seongbug, Rep. of Korea

[73] Assignee: SamSung Electronics Co., Ltd., Kyungki, Rep. of Korea

[21] Appl. No.: 738,309

[22] Filed: Jul. 31, 1991

[30] Foreign Application Priority Data

Nov. 23, 1990 [KR] Rep. of Korea .................. 90-18113

[51] Int. Cl.⁵ .............................................. G11B 15/60
[52] U.S. Cl. ....................................... 360/96.5; 360/93
[58] Field of Search ................ 360/96.5, 96.6, 132, 360/85, 95, 92, 93, 137; 369/77.1, 77.2

[56] References Cited

U.S. PATENT DOCUMENTS

| | | | |
|---|---|---|---|
| 4,792,872 | 12/1988 | Nakanishi et al. | 360/96.5 |
| 4,794,477 | 12/1988 | Hashiguchi et al. | 360/96.5 |
| 4,796,117 | 1/1989 | Fleck | 360/96.5 |
| 5,103,357 | 4/1992 | Nakanishi | 360/96.5 |

Primary Examiner—Stuart S. Levy
Assistant Examiner—Jefferson Evans
Attorney, Agent, or Firm—Robert E. Bushnell

[57] ABSTRACT

A lid opening mechanism for a DAT cassette, wherein the lid is slightly opened while inserting a tape cassette into its housing, and then the lid is completely opened when the tape cassette is placed on a deck, so that the load applied to the cassette is efficiently reduced and the size of the DAT tape cassette can be minimized.

21 Claims, 2 Drawing Sheets

LID OPENING MECHANISM FOR A DIGITAL AUDIO TAPE CASSETTE

BACKGROUND OF THE INVENTION

The present invention relates to a lid opening mechanism for a digital audio tape (DAT) tape cassette, and particularly to a mechanism in which a cassette can be opened more easily and the load applied to the tape cassette can be reduced.

In a conventional DAT cassette, a lid opening is done in the manner described below. That is, as shown in FIG. 1, if a tape cassette 1 comes to be positioned within a tray (not shown) of a DAT deck, the tray moves inwardly, and the tape cassette 1 which is mounted on the tray is placed on a bottom plate 5 (shown in FIG. 3A) of a cassette holder 4 (FIG. 3A). At the same time, a slide plate 3 (FIG. 3A) of the tape cassette 1 is engaged with a pair of protuberances 6 (FIG. 3A) which are projected forwardly from the bottom plate 5 of the cassette holder 4. Then the cassette holder 4 descends, and, at the same time, the lower leading end of the lid 2 of the tape cassette 1 is engaged with an engaging piece 7, so that the lid 2 should be pivotally opened.

However, as shown in FIG. 1A, if an inclined face 7a is formed on the upper end of the engaging piece 7, the lower leading end of the lid 2 of the tape cassette 1 is slid along the inclined face 7a, thereby reducing the load. However, in this case, the height h of the engaging piece 7 has to be higher than the descending distance H of the cassette 1, with the disadvantageous result that the volume of the tray housing assembly is increased, and ultimately the volume of the DAT deck is increased.

In an attempt to overcome the above-described problem, in case the upper face of the engaging piece 7 is formed with a chamfered face 7b as shown in FIG. 1B, the descending distance H becomes smaller than the height h of the engaging piece 7, and the lid 2 has to pass over the inclined face 7b, with the disadvantageous result that the load is increased.

SUMMARY OF THE INVENTION

It is the object of the present invention to provide a lid opening mechanism for a DAT cassette in which the load applied to the tape cassette upon opening of the cassette lid can be reduced.

The lid opening mechanism for a DAT cassette of the present invention is applied to a DAT cassette in which, when the DAT cassette is placed into the deck after being inserted into a cassette holder of a housing, the lid of the tape cassette is open.

In achieving the above object, the lid opening mechanism for a DAT cassette according to the present invention is characterized in that: the cassette lid is opened partly in a certain angle during the process of carrying the DAT cassette into the housing; and then, the lid is completely opened upon being placed on the deck, thereby reducing the load imposed on the tape cassette.

BRIEF DESCRIPTION OF THE DRAWINGS

A better understanding of the present invention may be obtained from a consideration of the detailed description hereinafter taken in conjunction with the drawings which are briefly described below.

DESCRIPTION OF THE PREFERRED EMBODIMENT

Figure 1A:
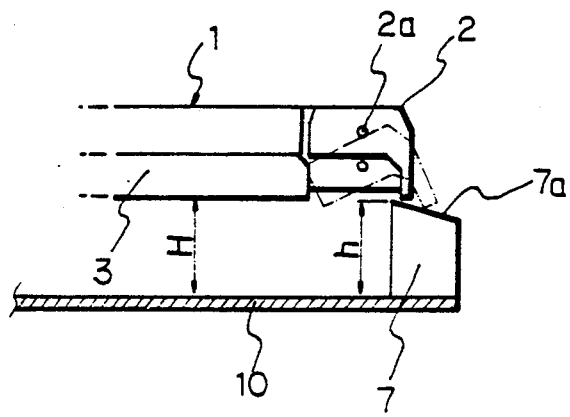
FIGS. 1A and 1B are side views of the critical portions of a conventional DAT cassette, showing a state with the lid being opened.
Figure 1B:
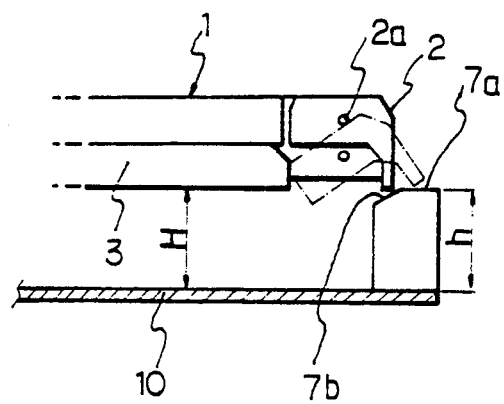
Figure 2:
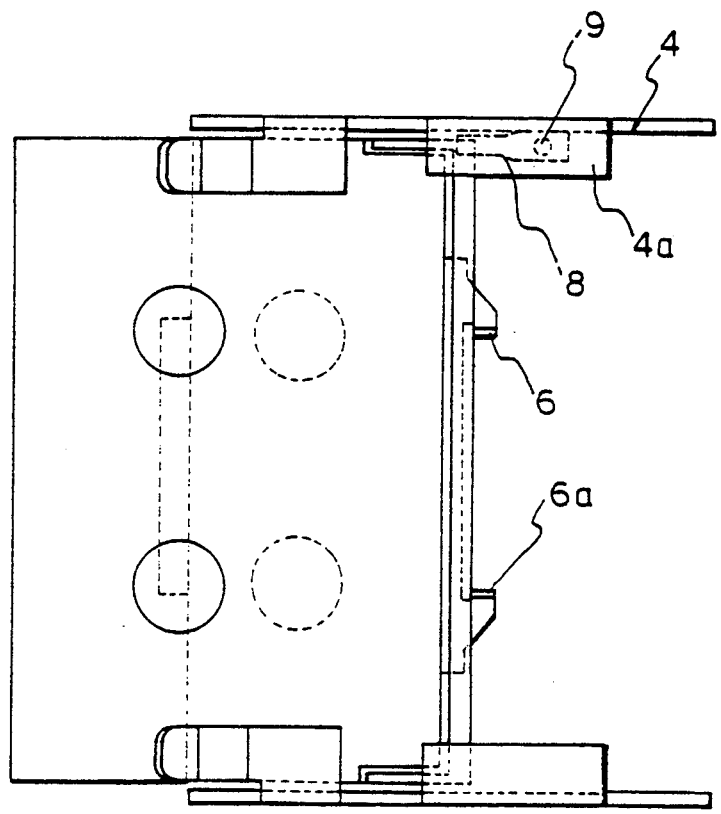
FIG. 2 is a plan view of a critical portion of a cassette holder, with the lid opening mechanism for a DAT cassette according to the present invention being installed thereon.

FIGS. 2 and 3 illustrate critical portions of a cassette holder which is installed in contact with a tray of a tray housing in a DAT deck. As shown in these drawings, a cassette holder 4 moves up and down, and installs a tape cassette 1 (mounted thereon) on to a supply reel table and a take-up reel table.

Figure 3A:
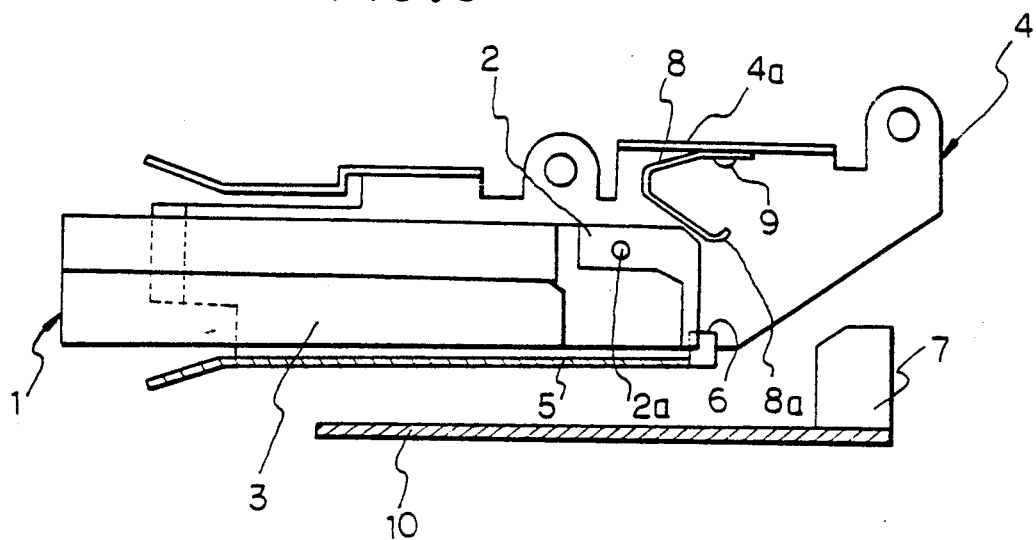
FIG. 3A and 3B are side views showing the lid opening state of the DAT cassette according to the present invention.

As revealed in FIG. 3A, a pair of protuberances 6 are projected from the leading end portion of a bottom plate 5 of the cassette holder 4, by which a slide plate 3 of the tape cassette 1 withdraws. A leaf spring 8 is fastened by means of a screw 9 to the bottom of a bent piece 4a which is provided on a side of the upper portion of the cassette holder 4. The lowermost portion of the leaf spring 8 is provided with a gently curved portion 8a, (see FIG. 3B) so that it should be elastically contacted with a part of the top face of the lid 2. The lid 2 is pivotally installed in the frontal portion of the tape cassette 1 by means of a shaft 2a.

On a side of a deck 10 on which the tape cassette 1 of the DAT is loaded, there is formed an engaging piece 7 which completely opens the lid 2 of the tape cassette 1.

Figure 3B:
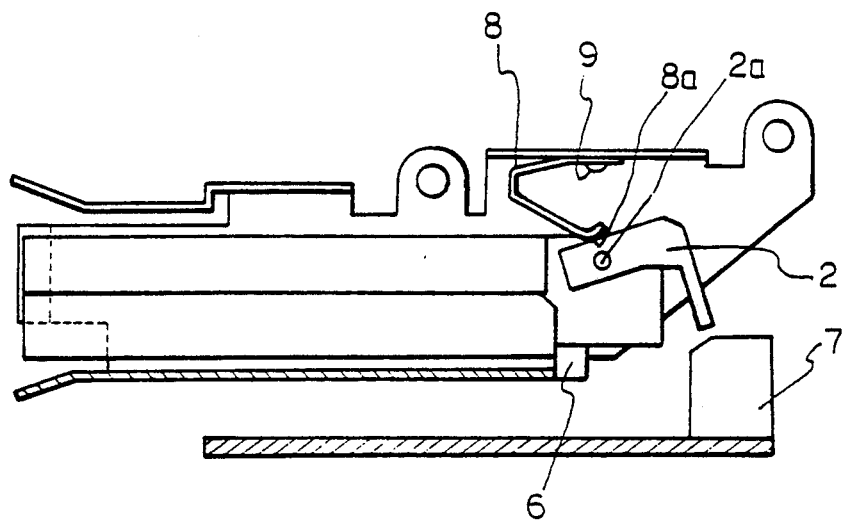

The mechanism of the present invention constituted as above will now be described as to its function and effect by referring to FIGS. 3(A) and 3(B).

If the tape cassette 1 mounted on the tray moves into the cassette, the tape cassette 1 is inserted into the cassette holder 4, and, during the insertion, the sliding plate 3 of the cassette holder 1 is pushed to a side until striking the protuberances 6 of the bottom plate 5 of the cassette holder 4 to open it. Consequently, the gently curved portion 8a of the leaf spring 8 comes to be elastically contacted with the top of the lid 2 of the cassette 1, and thus, when the gently curved portion 8a passes the shaft 2a of the lid 2, a side of the lid 2 is slightly pressed by the elastic force of the leaf spring 8, with the result that the lid 2 is slightly pivoted around the shaft 2a, and that the frontal portion of the lid 2 is slightly opened upwardly.

Under this condition, if the tape cassette 1 descends due to the descent of the cassette holder 4, then the lower leading end of the slightly opened lid 2 is engaged with the engaging piece 7, and consequently, the tape cassette is placed between the supply reel table and the take-up reel table to enter into an operating state.

According to the present invention as described above, the lid 2 of the cassette 1 advances from a slightly open state to a completely open state, and therefore, the load accompanied with opening the lid 2 of the tape cassette 1 can be reduced. This brings about the result that the capacity of the motor for lifting and lowering the cassette 1 can be reduced, as well as making it possible to miniaturize the DAT deck.

The invention is in no way limited to the particular example described hereinabove. Various modifications of the disclosed embodiment, as well as other embodiments of the invention will become apparent to persons skilled in the art upon reference to the description of the invention.

What is claimed is:

1. A lid opening mechanism in a digital tape player for opening a lid of a digital tape cassette, wherein the digital tape cassette comprises a tape housing with an opening providing access to an interior of the tape housing and a lid supported on said tape housing by a pivot and rotatable between a first position with the lid covering the opening and a second position with the lid uncovering the opening, the lid configured to have a top portion adjacent to the pivot and a frontal portion spaced from the pivot, said lid opening mechanism comprising:

a loading mechanism for stably placing the digital tape cassette onto a deck of the digital tape player, said mechanism including a cassette holder positionable to receive and transport in a longitudinal direction a digital tape cassette comprising a tape housing with an opening providing access to an interior of the tape housing and a lid supported on said tape housing by a pivot and rotatable between a first position with the lid covering the opening and a second position with the lid uncovering the opening, the lid configured to have a top portion lying in a plane substantially parallel to said direction of travel while the lid is in said first position and a frontal portion extending substantially perpendicularly to said top portion and said direction of travel while the lid is in said first position;

means for applying a force to said top portion of the lid to partially open the lid of the digital tape cassette as the tape cassette is being inserted into said cassette holder of the digital tape player; and means for completely opening the lid after completion of insertion of the tape cassette into said holder, as the digital tape cassette is moved by said cassette holder and placed onto the deck.

2. The lid opening mechanism according to claim 1, wherein:

said means for partially opening said lid comprises:

a leaf spring disposed to partially open the lid during insertion of the digital tape cassette into said cassette holder; and a bent piece for attaching said leaf spring to said cassette holder; and said means for completely opening the lid comprises an engaging piece installed on one side of said deck for completely opening the lid as said digital tape player is lowered onto the deck by said cassette holder.

3. The lid opening mechanism according to claim 2, further comprising a curved portion of said leaf spring for partially opening the lid through elastic contact between said curved portion of said leaf spring and said top portion of the lid during insertion of the digital tape cassette into said cassette holder.

4. The lid opening mechanism according to claim 2, further comprised of said bent piece attaching said leaf spring to a side of an upper portion of the cassette holder.

5. The lid opening mechanism according to claim 1, wherein:

said means for partially opening the lid comprises:

resilient biasing means for pressing on said top portion of the lid in order to partially open said lid; and said means for completely opening the lid is installed on the deck and completely opens the lid as the lid is loaded onto a supply reel table and a take-up reel table of said digital tape player.

6. The lid opening mechanism of claim 1, further comprised of said partially opening means being spaced-apart from said completely opening means.

7. The lid opening mechanism of claim 1, further comprised of said partially opening means engaging said top portion of the lid before said means for completely opening the lid engages a bottom section of said frontal portion, and said partially opening means continuing to engage top portion as said completely opening means initially engages said bottom section of said frontal portion of the lid.

8. The lid opening mechanism according to claim 7, further comprising a bent piece, wherein said leaf spring is attached to said holding means by said bent piece disposed on a side of an upper portion of the holding means.

9. A tape player for receiving a tape cassette, comprising:

a supply reel table and a take-up reel table;

holding means for receiving and conveying in a first direction of travel a tape housing of said tape cassette having three side portions, a first main wall and a second main wall, and a lid pivotally engaging two of said three side portions about a pivotal axis, the lid having a protecting portion extending substantially perpendicular to said first direction across a frontal portion of the tape cassette, a top portion lying in a plane generally parallel to said first direction and parallel to said first main wall when the lid is in a closed position and extending perpendicularly to the protecting portion, and two side walls for engaging said two of said three side portions, and for loading the tape cassette onto said supply reel table and said take-up reel table; and lid opening means for opening the lid to a partially opened position, as the tape cassette is being inserted into said holding means, by applying a force to said top portion of the lid, and for completely opening the lid after completion of insertion of the tape cassette into said holder, as the tape cassette is loaded onto said supply reel table and said take-up reel table.

10. The tape player of claim 9, wherein said lid opening mechanism comprises:

a leaf spring connected to said holding means and positioned to press said inner region of said top portion of the lid located between said pivotal axis and said first main wall, thereby opening the lid to said partially opened position; and an engaging piece installed on said deck for completely opening the lid when the lid is loaded onto said supply reel table and said take-up reel table.

11. The lid opening mechanism of claim 10, wherein said leaf spring further comprises a curved portion for providing an elastic contact between said curved portion and said inner region of said top portion of the lid located between said pivotal axis and said first main wall.

12. The lid opening mechanism of claim 10, further comprised of said leaf spring being spaced-apart from said engaging piece.

13. The lid opening mechanism according to claim 10, further comprising a bent piece, wherein said leaf spring is attached to said holding means by said bent piece disposed on a side of an upper portion of said holding means.

14. The tape player of claim 9, wherein:
said means for partially opening the lid comprises:
resilient biasing means for partially opening the lid upon insertion of the tape cassette into the holding means; and
said means for completely opening the lid is installed on said deck, and completely opens the lid as the tape cassette is loaded onto said supply reel table and said take-up reel table.

15. A method for opening a lid of a tape cassette being loaded into a cassette holder of a tape player, said method comprising the steps of:
partially opening a lid of a tape cassette being loaded into a cassette holder positioned to convey the tape cassette in a first direction of travel, wherein the tape cassette comprises a tape housing having three side portions, a first main wall and a second main wall, and the lid pivotally engaging two of said three side portions and pivoting about a pivotal axis, the lid having a protection portion extending substantially perpendicularly to said first direction across a frontal portion of the tape cassette, a top portion parallel to said first main wall when the lid is in a closed position and extending perpendicularly to said protecting portion, and two side walls for engaging said two of said three side portions, by applying a force to said top portion of the lid located between said pivotal axis and said first main wall, as the tape cassette is being inserted into the cassette holder; and
completely opening the lid after completion of insertion of the tape cassette into said holder, by applying a force to a bottom portion of said protecting portion when the tape cassette is lowered onto a deck of the tape player.

16. The method of claim 15, wherein said step of partially opening the lid comprises pressing down on said inner region of said top portion with resilient biasing means as the tape cassette is being inserted into the cassette holder.

17. The method of claim 15, wherein said step of partially opening the lid comprises pressing down on said inner region of said top portion with a leaf spring when, the tape cassette is inserted into said tape player.

18. A tape player for receiving a tape cassette having a lid, comprising:
a supply reel table and a take-up reel table;
a deck for supporting said supply reel table and said take-up reel table;
a cassette loading mechanism comprising a cassette holder for retaining and transporting in a first direction the tape cassette with the lid of the tape cassette having a top portion lying in a plane substantially parallel to said first direction while in a closed position, and having a upper portion of the cassette holder.

19. The tape player as claimed in claim 18, wherein said partially opening means comprises:
a leaf spring for applying said force to the lid during insertion of the tape cassette into said cassette holder; and
a piece for attaching said leaf spring to said cassette holder.

20. The tape player as claimed in claim 18, wherein said means for completely opening the lid comprises a member upstanding from the deck, for engaging and rotating the lid to completely open the lid during said lowering of the tape cassette.

21. The tape player as claimed in claim 20, wherein said upstanding member includes an inclined surface for engagement with the lid.

* * * * *

UNITED STATES PATENT AND TRADEMARK OFFICE
CERTIFICATE OF CORRECTION

PATENT NO. : 5,291,354
DATED     : 1 March 1994
INVENTOR(S) : Yoon-Bae Kim

It is certified that error appears in the above-indentified patent and that said Letters Patent is hereby corrected as shown below:

On the title page;
Inventor [75],    Change "Yoon B. Kim" to —Yoon Bae-Kim—.

Signed and Sealed this

Nineteenth Day of November, 1996

Attest:

BRUCE LEHMAN

*Attesting Officer*     *Commissioner of Patents and Trademarks*